United States Patent Office 2,960,280
Patented Nov. 15, 1960

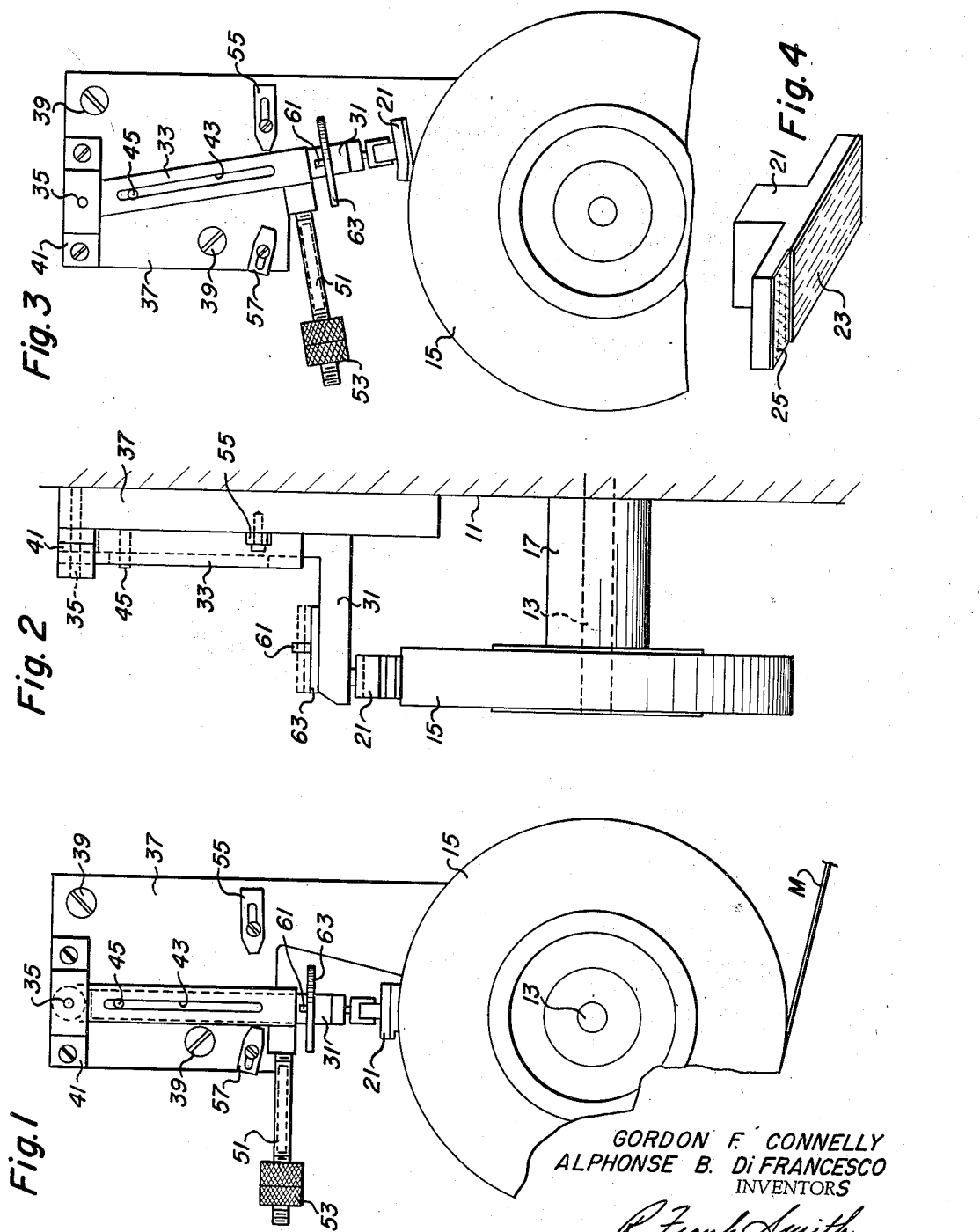

2,960,280

PERIPHERAL BRAKE AND TENSIONING DEVICE

Gordon F. Connelly and Alphonse B. Di Francesco, Rochester, N.Y., assignors to Eastman Kodak Company, Rochester, N.Y., a corporation of New Jersey Filed Dec. 22, 1958, Ser. No. 782,140

7 Claims. (Cl. 242—156.1)

The present invention relates to a peripheral brake and tensioning device and was designed for use in those applications where it is necessary to maintain a strip of material being unwound from a roll under constant tension.

While the peripheral brake and tensioning device of the present invention was specifically designed for use with capacitor winding apparatus and has been described in this application in conjunction with such apparatus, the many advantages and features of the device render it useful in other applications where it is desired to control the rotation of a roll as material is unwound therefrom. As is well known in the art, the winding of capacitors entails the enrolling on an arbor of a capacitor winding machine interleaved strips of metal foil and dielectric material. Each foil and dielectric strip is unwound from individual supply rolls and is conducted along predetermined paths to the winding arbor. It is important to maintain the dielectric and foil strips under constant tension during enrolling on the arbor in order to secure optimum and uniform electrical characteristics for the completed capacitors. Furthermore, in the case of loosely wound capacitors, the mechanical rigidity of the capacitors is often insufficient to permit practical use. During the winding of each capacitor while lead terminals are being positioned in the capacitor and after completing each capacitor, the actual unwinding of the dielectric and the foil strips is halted. Because of the inertia of the supply spools of such strips, the supply spools tend to continue to rotate after the winding arbor has stopped, with the result that the strips are overfed and are subjected to tension shocks when the arbor is again actuated to enroll the strips thereon.

While many brake mechanisms have been devised and used in capacitor winding apparatus such as described above, many of the known mechanisms fail to provide constant tension for the strips being enrolled on the arbor and many others fail to take up any overrun of the rolls of material resulting from the inertia of such rolls. The peripheral brake and tensioning device of the present invention was designed to avoid these defects of the known prior art brake mechanisms and comprises broadly a brake shoe for engaging the peripheral surface of a roll of material with a constant pressure whereby the braking force on the roll remains constant regardless of the radius of its periphery as determined by the number of turns of material remaining in said roll and means for reversing the direction of the roll to take up the lost tension in the material being unwound from the roll resulting from the overtravel of the roll.

The primary object of the present invention is, therefore, to provide in an apparatus for intermittently unwinding successive lengths of material from a wound roll thereof, a peripheral brake and tensioning device comprising means for maintaining the material being unwound from the roll under constant tension and means for taking up any overtravel of the roll between the unwinding of successive lengths therefrom and for maintaining under tension the material unwound from but still attached to said roll.

Another object of the present invention is to provide in an apparatus for intermittently unwinding successive lengths of material from a wound roll thereof, a peripheral brake and tensioning device comprising a brake shoe having surfaces of different friction characteristics for engaging the periphery of said roll, one surface being in engagement with said periphery during the unwinding of said material and having a braking effect on the rotation of said roll, and another surface being in contact with said periphery between the unwinding of said successive lengths and having a frictional characteristic preventing sliding movement of said periphery with respect to said shoe.

Other objects and advantages of the present invention will become readily apparent to those skilled in the art from the following description with reference to the drawings, in which like characters denote like parts and wherein:

Fig. 1 and Fig. 2 are front elevation views illustrating the peripheral brake and tensioning device of the present invention;

Fig. 3 is a side elevation view of the device; and

Fig. 4 is a perspective view of the brake shoe utilized in the peripheral brake and tensioning device of the present invention.

In Fig. 3 the numeral 11 designates the frame of a capacitor winding machine. A shaft 13 is carried by frame 11 for rotatably supporting a wound roll 15 of material M spaced from frame 11 by a suitable bushing 17. The material M is in strip form and in a capacitor winding machine such as referred to above would be either a relatively thin strip of dielectric material such as paper or a polyester sheeting or a strip of metal foil such as aluminum foil or tin foil.

The peripheral brake and tensioning device of the present invention comprises a brake shoe 21 having a composite pad for engaging the periphery of roll 15. The composite pad is formed with a first surface 23 which has a relatively low coefficient of friction and a second surface 25 having a much higher coefficient of friction. In making the peripheral brake and tensioning device of the present invention, applicants have been particularly successful in forming shoe 21 of one or more pieces of felt. Surface 23, a strip of Teflon tape, is cemented to the felt and surface 25 is formed by coating the felt with silicone rubber. Shoe 21 is carried on the end of an L-shaped bracket 31. Bracket 31 is slidably received in a channel-shaped guide 33 which in turn is mounted for pivotal movement about pivot 35 carried by mounting support 37. The mounting support 37 is firmly attached to the frame 11 of the capacitor winding machine by suitable screws 39, as illustrated in Fig. 1. The channel-shaped guide 33 is maintained in contact with the surface of support 37 by means of a U-shaped bracket 41 fixed on the upper end of support 37 and through which pivot 35 passes. The guide 33 is provided with a longitudinal slot 43 in the front side thereof, which slot receives a small pin 45 carried by the bracket 31. The guiding action of pin 45 in slot 43 further aligns bracket 31 within guide 33 for sliding movement toward and away from pivot 35. On the end of guide 33 remote from pivot 35 is attached a threaded shaft 51 which carries a weight 53. The line passing through pivot 35 and the center of shaft 13 is a vertical line, and the force of gravity acting on weight 53 tends to pivot guide 33 about pivot 35 in a counterclockwise direction as viewed in Fig. 1. A stop member 55 is mounted on support 37 to limit the counterclockwise movement of guide 33, as illustrated in Fig. 2, Another stop member 57 is mounted on support 37 to limit the movement of guide 33 in a clockwise direction, as illustrated in Fig. 1. The lower leg of bracket 31, which carries shoe 21, is provided with an upstanding pin 61 around which is carried one or more weights 63. Weights 63 maintain shoe 21 in engagement with the periphery of roll 15 by causing bracket 31 to slide within guide 33 toward the center of roll 15 as the number of turns of material M remaining on roll 15 decreases. The number of turns of material M in roll 15 determines the radius of the periphery of the roll.

The operation of the peripheral brake and tensioning device will now be described. During the enrolling of a capacitor, material M is unwound from roll 15 and wound onto the rotatably driven arbor (not shown) of the capacitor winding machine. As the material M is being withdrawn from roll 15, roll 15 rotates in a counter-clockwise direction and the frictional force on shoe 21 developed by the sliding movement of the periphery of roll 15 under surface 23 maintains the guide 33 in engagement with stop 57. This frictional force also has a braking effect on the rotation of roll 15 with the result that the material being withdrawn from the roll is maintained under tension. Since the guide 33 and shoe 21 are radially disposed with respect to roll 15 when material is being unwound therefrom, and since weight 63 applies a force through surface 23 in a radial direction, the pressure of surface 23 on the periphery of roll 15 is maintained at a substantially constant value regardless of the radius of the roll. Again it should be noted that during the unwinding of material from roll 15, shoe 21 is positioned as illustrated in Fig. 1 and only surface 23 is in contact with the periphery of the roll.

When the arbor of the capacitor winding machine stops withdrawing material M from roll 15, roll 15 tends to continue to rotate, as the result of its inertia, and the frictional force applied to the periphery of the roll through surface 23 is insufficient to bring the roll to an immediate halt. Obviously material M will then hang loosely between the roll 15 and the winding arbor. However, as soon as roll 15 does stop turning, the frictional force maintaining shoe 21 and guide 33 in radial alignment with the roll is removed, and weight 53 causes guide 33 to be rotated to the position indicated in Fig. 2 against stop 55. The coefficient of friction of surface 23 on the surface of roll 15 is sufficient to maintain surface 23 in non-sliding contact with the periphery of roll 15 whereby the periphery moves with shoe 21 and the lost tension in the material being withdrawn from the roll is taken up. When shoe 21 is in the position indicated in Fig. 2, only the high friction surface 25 is in engagement with the periphery of roll 15. When the winding arbor again starts to withdraw material M from roll 15 thereby commencing rotation of the roll, the friction force developed by surface 25 on the periphery of roll 15 is sufficient to prevent slippage of the roll with respect to shoe 21 and therefore shoe 21, together with bracket 31 and weight 63, are raised and returned to the position indicated in Fig. 1 against stop 57. In the latter position surface 23 is in contact with the periphery of the roll 15 and the coefficient of sliding friction for surface 23 on the periphery of the roll is sufficient to maintain shoe 21 in the position indicated in Fig. 1 with guide 33 in contact with the stop 57. Brake shoe 21, being preferably made of felt, is flexible, as illustrated in Fig. 2. This flexibility provides a more positive engagement of surfaces 23 and 25 on the periphery of roll 15 at the positions of shoe 21 illustrated respectively in Fig. 1 and Fig. 2.

It will now be apparent to those skilled in the art that we have disclosed a peripheral brake and tensioning device comprising a brake shoe having two surfaces of different friction characteristics for engaging the periphery of said roll, one surface being in engagement with said periphery during the unwinding of said material and having a braking effect on the rotation of said roll, and another surface being in contact with said periphery between the unwinding of said successive lengths and having a frictional characteristic preventing sliding movement of said periphery with respect to said shoe.

While only one embodiment of the present invention has been illustrated and described, many modifications and variations are possible and will become readily apparent to those skilled in the art from the foregoing description which is intended, therefore, to be illustrative only and the scope of the invention is defined in the appended claims.

Having now particularly described our invention, what we desire to secure by Letters Patent of the United States and what we claim is:

1. A peripheral brake and tensioning device for use in an apparatus designed to intermittently unwind successive lengths of material from a wound roll thereof supported for rotation about an axis, said device comprising a brake shoe for retarding the free rotation of said roll, means adjustably mounting said shoe for radial movement with respect to said roll and for contacting the periphery of said roll whereby the engagement of said shoe therewith is maintained regardless of the number of turns of material forming the roll, second means mounting said shoe for movement between a first position in contact with said periphery and a second position in contact with said periphery and angularly displaced about said periphery from said first position, the movement of said shoe from said first to said second position being in the direction of winding movement of that region of the roll periphery in contact with the shoe, said shoe being maintained in said first position by slipping engagement with the roll periphery during the unwinding of said material, and means for moving said shoe to said second position during the intervals between unwinding of successive lengths of said material, the movement of said shoe to said second position simultaneously moving the periphery of said roll in a material winding direction by means of the engagement of the shoe therewith, whereby any overtravel of said roll is taken up and tension is maintained in the material unwound from but still attached to said roll.

2. A peripheral brake and tensioning device in accordance with claim 1 wherein said shoe is formed with two roll contacting surfaces of different friction characteristics, one of said surfaces being located for contact with said periphery when said shoe is in said first position and the second of said surfaces being located for contact with said periphery when said shoe is in said second position, the coefficient of friction of said second surface being sufficiently high to prevent sliding movement of said periphery with respect to said second surface, whereby upon the unwinding of a length of said material said shoe is moved from said second to said first position.

3. A peripheral brake and tensioning device in accordance with claim 2 and including means for maintaining said shoe, when in said first position, in substantially constant pressure contact with said periphery regardless of the radius of said periphery as determined by the number of turns of material forming said roll, whereby the braking effect of said first surface on said periphery remains relatively constant during the unwinding of said material from said roll.

4. A peripheral brake and tensioning device in accordance with claim 3 wherein said radial movement mounting means comprises a bracket member carrying said shoe on one end thereof and a guide member mounted in said apparatus and slidably receiving said bracket member for radial movement with respect to said roll, and wherein said second mounting means comprises a pivotal support for the end of said guide member remote from said roll, said pivotal support being carried by said apparatus parallel to the rotational axis of said wound roll.

5. A peripheral brake and tensioning device in accordance with claim 4 including stop means mounted in said apparatus for engaging said guide member and determining the positions occupied by the guide member in said apparatus when said shoe is located in said first position and in said second position, and wherein said means for moving said shoe to said second position comprises unbalancing weight means mounted on said guide member for urging said guide member into engagement with the stop means locating said guide means in the position at which said shoe is located in said second position, and means for adjusting said unbalancing weight means to maintain said shoe in said first position during the unwinding of said material from said roll.

6. A peripheral brake and tensioning device in accordance with claim 2 wherein said radial movement mounting means comprises a bracket carrying said shoe on one end thereof, and a guide member slidably receiving said bracket member and mounted in said apparatus to guide the bracket for vertical movement therein, and wherein weight means carried by said shoe maintains said shoe, when in said first position, in substantially constant pressure contact with said periphery regardless of the radius thereof as determined by the number of turns of material forming said roll, whereby the braking effect of said first surface on said periphery remains relatively constant during the unwinding of said material from said roll.

7. A peripheral brake and tensionnig device in accordance with claim 6 wherein said second mounting means comprises means supporting the end of said guide member remote from said roll and mounting said guide member for pivotal movement about an axis which is parallel to the rotational axis of said wound roll, and wherein said means for moving said shoe to said second position comprises unbalancing weight means mounted on said guide member for urging said guide member to a position locating said shoe in said second position, and means for adjusting the unbalance of said unbalancing weight means to maintain said shoe in said first position during the unwinding of said material from said roll.

References Cited in the file of this patent

UNITED STATES PATENTS

| | | |
|---|---|---|
| 1,027,339 | Johnson | May 21, 1912 |
| 1,135,702 | Larson | Apr. 13, 1915 |